United States Patent
Zhu et al.

(10) Patent No.: US 7,876,264 B2
(45) Date of Patent: Jan. 25, 2011

(54) METHOD OF SOURCE NUMBER ESTIMATION AND ITS APPLICATION IN METHOD OF DIRECTION OF ARRIVAL ESTIMATION

(76) Inventors: Weiqing Zhu, No. 21 Bei Si Huan Xi Road, Haidian District, Beijing (CN) 100080; Jun Hu, No. 21 Bei Si Huan Xi Road, Haidian District, Beijing (CN) 100080; Xiaodong Liu, No. 21 Bei Si Huan Xi Road, Haidian District, Beijing (CN) 100080; Zhiyu Liu, No. 21 Bei Si Huan Xi Road, Haidian District, Beijing (CN) 100080; Feng Pan, No. 21 Bei Si Huan Xi Road, Haidian District, Beijing (CN) 100080

( * ) Notice: Subject to any disclaimer, the term of this patent is extended or adjusted under 35 U.S.C. 154(b) by 174 days.

(21) Appl. No.: 12/051,569

(22) Filed: Mar. 19, 2008

(65) Prior Publication Data
US 2008/0231505 A1    Sep. 25, 2008

(30) Foreign Application Priority Data
Mar. 23, 2007    (CN) .................. 2007 1 0064746

(51) Int. Cl.
*G01S 5/02* (2010.01)
*G01S 3/14* (2010.01)

(52) U.S. Cl. ...................... 342/417; 342/378

(58) Field of Classification Search ................. 342/350, 342/368, 377, 378, 382, 451, 417
See application file for complete search history.

(56) References Cited

U.S. PATENT DOCUMENTS 6,498,581 B1 * 12/2002 Yu ............................... 342/90
6,822,606 B2 * 11/2004 Ponsford et al. ............ 342/192

OTHER PUBLICATIONS

Advances in Direction-of-Arrival Estimation, (Sathish Chandran, ed. 2005).

* cited by examiner

*Primary Examiner*—Dao L Phan
(74) *Attorney, Agent, or Firm*—Whiteford, Taylor & Preston LLP; Gregory M. Stone; Jeffrey C. Maynard (57) ABSTRACT

The present invention provides a method of source number estimation based on eigenspace in DOA estimation, including: (1) obtaining signals received by uniform linear array; (2) calculating a covariance matrix according to the received signals; (3) calculating a complex-valued covariance matrix or a covariance matrix after real-valued computations; (4) conducting eigendecomposition to the covariance matrix to obtain its eigenvector matrix; (5) calculating a source number decision based on the eigenvector; (6) calculating a ratio; and (7) source number estimation. The present invention can accurately estimate source number and save huge amounts of computation during signal processing in DOA estimation, and lower the cost of hardware.

10 Claims, 4 Drawing Sheets

METHOD OF SOURCE NUMBER ESTIMATION AND ITS APPLICATION IN METHOD OF DIRECTION OF ARRIVAL ESTIMATION

CROSS-REFERENCE TO RELATED APPLICATION

This application is based upon and claims the benefit of Chinese Patent Application No. CN 200710064746.9 filed on Mar. 23, 2007 by the inventors herein, the specification of which is incorporated herein by reference.

BACKGROUND OF THE INVENTION

1. Field of the Invention

The present invention generally relates to a signal processing method applied in direction of arrival (DOA) estimation, and in particular, relates to a source number estimation method based on eigenspace, and method of DOA estimation using said source number estimation method.

BACKGROUND

Most processing methods used in the DOA estimation are based upon a signal subspace algorithm. It is necessary to have known signal source number (which is also abbreviated as source number), so that signal subspace and noise subspace are orthogonal, and thereby accurate DOA estimation will be achieved. However, in most cases, source number is unknown instead during the DOA estimation, thus it is required to estimate the source number in the first place. If mistakes happen in the course of source number estimation, then the signal subspace and the noise subspace are no longer orthogonal, thus which might results in miss alarm and pseudo alarm of the signal source as well as deviation of DOA estimation results. Overall, source number estimation is one of the most crucial techniques applied in DOA estimation accordingly.

WANG Yongning suggests that the source number estimation method using Gerschgorin disks (herein referred to as Gerschgorin disks estimation method) proposed by H. T. Wu et al. is an excellent method in his book "The theory and algorithm of estimation of spatial spectrum, Tsinghua University Press, Beijing, China, November 2004". It is worth noting that the source number estimation method using Gerschgorin disks has been proposed and explained in several theses written by H. T. Wu, namely "Source number estimator using Gerschgorin disks, Proc. ICASSP, Adelaide, Australia, April 1994, 261-264", "Source number estimation using transformed Gerschgorin radii, IEEE Trans. on SP, 1995, 43(6): 1325-1333" and "Gerschgorin radii based source number detection for closely spaced signals, Proc. IEEE int. Conf. Acoust. Speech, Signal processing. Atlanta, May 1996, 3054-3057". The magnitude of eigenvalues derived from the signal covariance matrix are not required in a precise manner according to the basic technical proposal of aforesaid method, while such each location of eigenvalues are only estimated using the Gerschgorin disks theorem instead. Within these Gerschgorin disks, The Gerschgorin disks of signals have large radii, while the Gerschgorin disks of noises have small radii. Source number is correspondingly estimated through the number of the Gerschgorin disks having bigger radii. Based on such proposals, one kind of heuristic criterion, which is able to distinguish between eigenvalues of signals and eigenvalues of noises, has been brought forth by H. T. Wu et al. In above way, source number could be easily estimated. However, in the case of relatively low signal-to-noise ratio, either underestimation or overestimation might occur usually. Besides the above problems, when correlation coefficient of spatial correlated colored noises is relatively large, performance tends to deteriorate. Furthermore, eigenvalue decomposition is supposed to impose on (M−1)×(M−1) order signals covariance matrix in the Gerschgorin disks estimation method, herein M represents sensor element number. Likewise, eigenvalue decomposition is imposed on M×M order signals covariance matrix in DOA estimation. Therefore, in order to obtain accurate DOA, if the Gerschgorin disks estimation method is employed to estimate source number, it is inevitable to conduct eigenvalue decomposition twice as previously mentioned during which substantial computation amount is consumed and hardware cost is increased as well. Last but not the least, above-mentioned computation is hardly achieved in real-valued space, thus the advantages of reduced computation amount in real-valued space cannot be obtained as a result.

Overall, in view of above-mentioned disadvantages that exist in the current source number estimation method using Gerschgorin disks, thus a novel source number estimation method having higher estimation precision, less computation amount and better robustness is utterly required.

SUMMARY OF THE INVENTION

The purpose of this invention is to overcome the disadvantages of the prior art, and to provide a source number estimation method having higher estimation precision, less computation amount and better robustness that is suitable for DOA estimation techniques.

In order to achieve the above purpose and according to a first aspect of the present invention, a method of source number estimation is provided, including:

(1) Obtaining signals X(t) received by a uniform linear array, $X(t)=[x_1(t), x_2(t), \ldots, x_M(t)]^T$ is M×1 vector, where $x_1, \ldots, x_M$ represent signals received by elements from 1 to M in said uniform linear array, t represents time point;

(2) Calculating a covariance matrix $\hat{R}_X$ according to the received signals;

(3) Conducting eigendecomposition to $\hat{R}_X$ to obtain its eigenvector matrix $U_C[q_1, q_2, \ldots, q_M]$, where $q_i$ is eigenvector of $\hat{R}_X$, $q_i=[*q_{1i}, q_{2i}, \ldots, q_{mi}, \ldots q_{Mi}]^T$, i=1, 2, ..., M;

(4) Calculating a source number m according to the $q_i$.

According to a second aspect of the present invention, equation $$\hat{R}_X = \frac{1}{L}\sum_{l=1}^{L} X(t_l)X(t_l)^H$$

is adopted to calculate the covariance matrix in step (2), where L is the number of snapshots.

According to a third aspect of the present invention, the following steps are included after step (2):

(a) Calculating the matrix $\hat{R}_{fb}$ from the covariance matrix $\hat{R}_X$, where $\hat{R}_{fb}$ is the covariance matrix after a front-back space smooth processing conducted on received data of the whole array;

(b) Calculating the covariance matrix $\hat{R}_T = Q_M^H \hat{R}_{fb} Q_M$ after real-valued computations from $\hat{R}_{fb}$;

and step (3) includes: let $\hat{R}_X = \hat{R}_T$, and conducting eigendecomposition to $\hat{R}_X$ to obtain its eigenvector matrix $U_R = Q_M^H U_C$, $U_R = [q_1, q_2, \ldots, q_M]$, where $q_i$ is the eigenvector of $\hat{R}_X$, $q_i = [q_{1i}, q_{2i}, \ldots, q_{mi}, \ldots, q_{Mi}]^T$, i=1, 2, ..., M.

According to a fourth aspect of the present invention, step (4) includes:

(4.1) Calculating the decision value $\overline{|q_m|}$ by equation $$\overline{|q_m|} = \frac{1}{M}\sum_{i=1}^{M} |q_{im}|,$$

$m=1, 2, \ldots, M$;

(4.2) The source number m is determined according to the decision value $\overline{|q_m|}$.

According to a fifth aspect of the present invention, step (4.2) includes:

(4.3) Calculating the ratio $\beta_m$ based on the equation $\beta_m = \overline{|q_m|}^2/\overline{|q_{m+1}|}$, where $m=1, 2, \ldots, M$;

(4.4) Determining m, which corresponds to the maximum of $\beta_m$, $m=1, 2, \ldots, M$, and m is the source number.

According to a sixth aspect of the present invention, the $q_i$ are sequenced according to their corresponding eigenvalues in step (3), $i=1, 2, \ldots, M$.

According to a seventh aspect of the present invention, a method of DOA estimation is provided by the present invention, including:

(1) A uniform linear array for the receipt of array signals X(t). Calculating the source number K by any method of source number estimation in aspects 1-6;

(2) Obtaining the covariance matrix $\hat{R}_X$ described in any aspect from first to sixth, which is an M×M matrix;

(3) Conducting DOA estimation using said $\hat{R}_X$ to obtain DOA.

According to an eighth aspect of the present invention, a source number estimation device is provided, including:

(1) A uniform linear array that includes elements from 1 to M for obtaining signals X(t) received by uniform linear array, $X(t)=[x_1(t), x_2(t), \ldots, x_M(t)]^T$ is M×1 vector, where $x_1, \ldots, x_M$ represent the signals received by elements from 1 to M in said uniform linear array, t represents time;

(2) Means of covariance matrix calculation for the calculation of covariance matrix $\hat{R}_X$ based on received signals;

(3) Means of eigendecomposition for the eigendecomposition of $\hat{R}_X$ to obtain its eigenvector matrix $U_C[q_1, q_2, \ldots, q_m]$, where $q_i$ is the eigenvector of $\hat{R}_X$, $q_i=[q_{1i}, q_{2i}, \ldots, q_{mi}, \ldots, q_{Mi}]^T$, $i=1, 2, \ldots, M$;

(4) Means of source number calculation for the calculation of source number m based on $q_i$.

According to a ninth aspect of the present invention, the above means of covariance matrix calculation calculates covariance matrix according to equation $$\hat{R}_X = \frac{1}{L}\sum_{i=1}^{L} X(t_l)X(t_l)^H,$$

where L is the number of snapshot.

According to a tenth aspect of the present invention, the following means are also included:

Means for calculating matrix $\hat{R}_{fb}$ based on covariance matrix $\hat{R}_X$, where $\hat{R}_{fb}$ is the covariance matrix after a front-back space smooth processing conducted on received data of the whole array;

Means for calculating covariance matrix $\hat{R}_T = Q_M^H \hat{R}_{fb} Q_M$ after the real-valued computations from $\hat{R}_{fb}$; and Said means of eigendecomposition conducts following calculations: let $\hat{R}_X = \hat{R}_T$, and proceed with eigendecomposition with $\hat{R}_X$ to obtain its eigenvector matrix $U_R = Q_M^H U_C$, $U_R = [q_1, q_2, \ldots, q_M]$, where $q_i$ is eigenvector of $\hat{R}_X$, $q_i = [q_{1i}, q_{2i}, \ldots, q_{mi}, \ldots, q_{Mi}]^T$, $i=1, 2, \ldots, M$.

According to an eleventh aspect of the present invention, the means of source number calculation includes:

Means for calculating decision value $\overline{|q_m|}$ according to equation $$\overline{|q_m|} = \frac{1}{M}\sum_{i=1}^{M} |q_{im}|, m = 1, 2, \ldots, M; \text{ and}$$

Means for the determination of source number m according to decision value $\overline{|q_m|}$.

According to a twelfth aspect of the present invention, the means for the determination of source number m according to decision value $\overline{|q_m|}$ also includes:

Means for calculating the ratio $\beta_m$ according to equation $\beta_m$ $\overline{|q_m|}^2/\overline{|q_{m+1}|}$, where $m=1, 2, \ldots, M$;

Means for determining m that corresponds to the maximum of $\beta_m$, $m=1, 2, \ldots, M$, and m is the source number.

By comparison with the prior art, advantages achieved by the present invention include:

1. The orthogonality between signal subspace and noise subspace is adopted in the present invention where the covariance matrix $\hat{R}_X$ are directly projected on the signal subspace and noise subspace respectively after noise reduction processing, thereby the source number can be estimated accurately.

2. Eigenvalue decomposition is imposed on M×M order covariance matrix in the present invention. The covariance matrix after such decomposition can be applied into follow-up DOA estimation directly without having another eigenvalue decomposition. Provided that computation amount of above eigenvalue decomposition accounts for at least half of the total computation amount, thereby substantial computation amount can be saved and hardware cost can be reduced in the course of DOA estimation signal processing by virtue of the present invention.

3. Given that the method proposed in the present invention can be applied in real-valued space, the computation amount can be further reduced.

BRIEF DESCRIPTION OF THE DRAWINGS

FIG. 2 shows the performance comparison between one embodiment in accordance with the present invention with Gerschgorin disks estimation method in accordance with prior arts, herein

DESCRIPTION OF EXEMPLARY EMBODIMENTS

These and other features of the invention can best be understood by the following description of the accompanying drawings as well as embodiments:

For the purpose of better appreciation with regard to the present invention, at first the present invention will be illustrated theoretically below.

Section 1. Method of Source Number Estimation in Eigenspace

Suppose that the number of elements comprising one uniform linear array is M and these elements are responsible for receiving signals sent out from a signal source. In addition, suppose that K far-field narrow-band signals (i.e. the number of signal sources is K) are received. Besides, suppose that the incidence angles of signals sent out by each signal source corresponding to a uniform linear array are $(\theta_1, \theta_2, \ldots, \theta_K)$, and then array signal received by the linear array is as follow:

$$X(t)=AS(t)+N \quad (1)$$

where t represents time, and each item is as follows:

$$X(t)=[x_1(t), x_2(t), \ldots, x_M(t)]^T, \quad (2a)$$

which is an M×1 vector $A=[a(\theta_1), a(\theta_2), \ldots, a(\theta_K)]$, which is an M×K array's steering matrix (2b)

$$a(\theta_k) = \left[1, e^{-j\frac{\omega d \sin\theta_k}{c}}, \ldots, e^{-j(M-1)\omega \frac{d\sin\theta_k}{c}}\right],$$

which are referred to as steering vectors, k=1, ..., K (2c)

$S(t)=[s_1(t), s_2(t), s_3(t), \ldots, s_K(t)]^T$, which represents K narrow-band signals (2d)

N(t) is an M×1 noise vector (2e)

where $j=\sqrt{-1}$, c is the speed of sound in the medium, $\omega$ is the center frequency of the signals, d is the distance between neighboring base elements, and the superscript T represents the matrix transposition. Moreover, A can be written as follows in another format:

$$A = [b_1, b_2, \ldots, b_M]^T \quad (3a)$$

$$b_i = \left[e^{-j(i-1)\omega \frac{d\sin\theta_1}{c}}, \ldots, e^{-j(i-1)\omega \frac{d\sin\theta_K}{c}}\right]^T, i=1,2,\ldots,M \quad (3b)$$

where $b_i$ are the row vectors of A. Under the condition of spatial white noise, if signal S is uncorrelative with noise, the covariance matrix of array signal can be written as follows:

$$R_X = E[X(t)X^H(t)] \quad (4)$$
$$= AR_S A^H + \sigma^2 I$$

wherein $R_S$ is the covariance matrix of signal S, $\sigma^2$ is the variance of noise and I is a unit matrix. In the real practice, since $R_X$ is barely achieved, $R_X$ is, instead, approximated with the estimation value below:

$$\hat{R}_X = \frac{1}{L}\sum_{l=1}^{L} X(t_l)X(t_l)^H \quad (5)$$

where L is the number of snapshots, and superscript H represents the matrix conjugate transposition, then $\hat{R}_X$ can be also represented as:

$$\hat{R}_X=[A\hat{R}_S b_1^H, A\hat{R}_S b_2^H, \ldots, A\hat{R}_S b_M^H]+\sigma^2 I \quad (6)$$

wherein $\hat{R}_S$ is the estimated value of covariance matrix of signals, which is represented as follows:

$$\hat{R}_S = \frac{1}{L}\sum_{l=1}^{L} S(t_l)S(t_l)^H \quad (7)$$

If signals are uncorrelative among each other always, then $\hat{R}_S$ is full bank and diagonal matrix as well. Here none of vectors $\hat{R}_S b_i^H$ is zero, i=1, 2, ..., M. In order to minimize the contribution of noise, the noise reduction computation is performed as following formula:

$$\hat{R}'_X=\hat{R}_X-\gamma^2 I=[A\hat{R}_S b_1^H, A\hat{R}_S b_2^H, \ldots, A\hat{R}_S b_M^H]+\delta^2 I \quad (8)$$

where $\gamma^2$ is the mean value of two least eigenvalues in the covariance matrix estimation of array signal, namely $\gamma^2=(\sigma^2_{M-1}+\sigma^2_M)/2$. We have $\gamma^2=\sigma^2$, $\delta^2=0$ when the noise is spatial white noise. In real practice, there is a difference between noise and spatial white noise, and $\delta^2$ is not zero but a small value.

To one with ordinary skill in the art, the above embodiment shows a method of covariance matrix computation and noise reduction processing. However, with the instruction of the present invention, one having ordinary skill in the art can design and realize other methods of covariance matrix computation and noise reduction processing within the spirit of the present invention.

The covariance matrix of array signal can be shown as $$\hat{R}_X=U_C\Sigma U_C^H=U_S\Sigma_S U_S^H+U_N\Sigma_N U_N^H \quad (9)$$

wherein, $\Sigma$, $\Sigma_S$, and $\Sigma_N$ are the diagonal matrixes made up of covariance matrix eigenvalues of array signals, signals, and noise respectively, and $U_C$, $U_S$, and $U_N$ are eigenvector matrix of covariance matrix of array signals, signals, and noise respectively. It can be proved that the covariance matrix of array signals after the noise reduction processing $\hat{R}'_X$ is $$\hat{R}'_X=U_C\Sigma' U_C^H=U_S\Sigma'_S U_S^H+U_N\Sigma'_N U_N^H \quad (10)$$

wherein, $\Sigma'$, $\Sigma'_S$, and $\Sigma'_N$ are the diagonal matrixes made up of eigenvalue of array signals, signals, and noise subtracted by estimated noise power $\gamma^2$ respectively, $U_C$, $U_S$, and $U_N$ remain the same as before the noise reduction. $U_C$ is represented as $U_C = [q_1, q_2, \ldots, q_M]$, where $q_i$ are the eigenvectors of $\hat{R}'_X$, i=1, 2, ..., M. The eigenvalue of $\hat{R}'_X$ is $\lambda_i$, i=1, 2, ..., M, and they are sequenced from large to small. $q_i$ are sequenced according to the magnitude of their corresponding eigenvalue. Then calculate the projection $U_C^H \hat{R}'_X$ of $\hat{R}'_X$ onto $U_C$, and column i is $$P_i[p_{i1}, p_{i2}, \ldots, p_{im}, \ldots, p_{iM}]^T \; i=1, 2, \ldots, M \qquad (11)$$

$$\text{Then } P_i = [U_C^H A \hat{R}_S b_i^H + \delta^2], \; i=1, 2, \ldots, M \qquad (12)$$

Since the source signal subspace and steering vector lie in the same space, the magnitude of their corresponding projection $p_{im}$ ought to be a relatively large value. On the other hand, since the noise subspace and the steering vector are orthogonal, the magnitude of their corresponding projection $p_{im}$ ought to be a relatively small value. This is the basic theorem of the present invention. The details are introduced below.

The power of each signal is usually different. To improve the performance of source number estimation, the normalization of signal power is necessary. $U_C^H \hat{R}'_X$ can be presented as follows $$U_C^H \hat{R}'_X = [U_S \; U_N]^H [U_S \Sigma'_S U_S^H + U_N \Sigma'_N U_N^H] = \begin{bmatrix} \Sigma'_S U_S^H \\ \Sigma'_N U_N^H \end{bmatrix} \qquad (13)$$

It is easy to prove that each row of $\Sigma'_S U_S^H$ and $\Sigma'_N U_N^H$ is proportional to $\lambda_1-\gamma^2, \lambda_2-\gamma^2, \ldots, \lambda_M-\gamma^2$ respectively. Therefore, normalizations using $\lambda_1-\gamma^2, \lambda_2-\gamma^2, \ldots, \lambda_M-\gamma^2$ respectively, can reduce negative effects arising from different signal powers in the course of source number estimation.

It can be deduced from equation (13) that after the normalization of power, the projection of $\hat{R}'_X$ onto $U_C$ is $U_C^H$. Therefore, we can estimate the target number using $U_C = [q_1, q_2, \ldots, q_M]$. $q_i$ is represented as follows $$q_i = [q_{1i}, q_{2i}, q_{mi}, \ldots, q_{Mi}]^T, \; i=1, 2, \ldots, M \qquad (14)$$

The mean magnitude of the mth row in $U_C^H$ is $$\overline{|q_m|} = \frac{1}{M} \sum_{i=1}^{M} |q_{im}|, \; m=1, 2, \ldots, M \qquad (15)$$

$\overline{|q_m|}$ is called the decision of source number estimation. Based on the above analysis, $\overline{|q_m|}$ can be divided into two groups according to their magnitude, the larger group corresponding to the signal source, and the quantity of m is the source number.

Based on the above research and a mass of numerical analysis, the following method of source number estimation is brought forward, which has been proved to be effective both in simulation calculation and in practical application. The method is briefly described below:

(1) Calculate $U_C$ from $\hat{R}_X$.

(2) Calculate $\overline{|q_m|}$ according to equation (15), m=1, 2, ..., M.

(3) Calculate the ratio $\beta_m = \overline{|q_m|^2}/\overline{|q_{m+1}|}$, m=1, 2, ..., M.

(4) The m corresponding to the maximum of $\beta_m$ is the source number.

Section 2. Method of Source Number Estimation in the Real-Valued eigenspace

In this section, the supposition is the same as in the previous section, which supposed that signals are uncorrelative among each other, signals are uncorrelative with noises as well, and the noises are spatial white noises. When M is 2n or 2n+1 respectively, define sparse matrix $Q_M$ as below:

$$Q_{2n} = \frac{1}{\sqrt{2}} \begin{bmatrix} I_n & jI_n \\ J_n & -jJ_n \end{bmatrix} \qquad (16)$$

$$Q_{2n+1} = \frac{1}{\sqrt{2}} \begin{bmatrix} I_n & 0 & jI_n \\ 0 & \sqrt{2} & 0 \\ J_n & 0 & -jJ_n \end{bmatrix}$$

where $J_n$ is an n×n dimension permutation matrix, and $I_n$ is an n×n dimension identity matrix.

The method in "The theory and algorithm of estimation of spatial spectrum" written by Wang Yongning is adopted herein, the array's covariance matrix after real-valued computations in real-valued space can be represented as following:

$$\hat{R}_T = Q_M^H \hat{R}_{fb} Q_M \qquad (17)$$

where $\hat{R}_{fb}$ is the covariance matrix after a front-back space smooth processing conducted on received data of the whole array. It can be proved that the matrix made up of eigenvectors of $\hat{R}_T$ is $U_R = Q_M^H [U_S U_N]$. Plus $Q_M^H Q_M = I$, the equation below can be achieved:

$$\hat{R}_T = Q_M^H A \hat{R}_S A^H Q_M + \sigma^2 I \qquad (18)$$

The operations are similar to that in the previous section, and only brief introduction is given in this section. Noise reduction is conducted:

$$\hat{R}'_T = \hat{R}_T - \eta^2 I = Q_M^H A \hat{R}_S A^H Q_M + \Delta^2 I \qquad (19)$$

where $\eta^2$ and $\Delta^2$ have similar definition as $\gamma^2$ and $\delta^2$ respectively, however, such that $\eta^2$ and $\Delta^2$ are only in real-valued space. The eigenvector matrix of $\hat{R}'_T$ is $U_R = [q_1, q_2, \ldots, q_M]$, wherein $$q_i = [q_{i1}, q_{i2}, q_{im}, \ldots, q_{iM}]^T, \; i=1, 2, \ldots, M \qquad (20)$$

To save symbols, $q_i$ is still used in discussion of real-valued space, which is formally the same as the complex number space in equation (14). Attention should be paid to their differences during practical calculations. After the normalization of power, $U_R^H \hat{R}'_T$ becomes $U_R^H$, so the target number can be estimated by $U_R$.

The decision $\overline{|q_m|}$ for source number estimation can be calculated according to equation (15), of which the number of m in a group of larger $\overline{|q_m|}$ corresponds to the source number. The computation amount in real-valued eigenspace method is one fourth of that in complex-valued eigenspace method. Considering the computation amount of transformation to real-valued computations, the rate increases to about three-fourths.

Section 3. Source Number Estimation Method Applied in DOA Estimation Based on Eigenspace Proposed in the Present Invention The source number estimation method applied in DOA estimation based on eigenspace proposed in the present invention is summarized as below, including the following steps:

(1) Obtain signal X(t) received by uniform linear array, and $X(t)=[x_1(t), x_2(t), \ldots, x_M(t)]^T$ is an M×1 vector, where $x_1, \ldots, x_M$ represent signals received by array elements from 1 to M, and t represents time; and M is the number of array elements of the uniform linear array;

(2) Estimation value of covariance matrix is given by $$\hat{R}_X = \frac{1}{L}\sum_{l=1}^{L} X(t_l)X(t_l)^H$$

where L is the number of snapshots.

Method 1: eigenspace source number estimation method, where X(t) are usually complex-value, and the source number estimation method in the eigenspace of complex-valued space is abbreviated as the eigenspace source number estimation method and includes following steps:

(1-3) Conduct eigendecomposition to $\hat{R}_X$ to obtain its eigenvector matrix $U_C[q_1, q_2, \ldots, q_M]$, where $q_i$ is the eigenvector of $\hat{R}_X$, i=1, 2, ..., M and $q_i$ are sequenced from large to small according to their corresponding eigenvalues; either the subspace iteration method by G. Xu, T. Kailath in "A fast algorithm for signal subspace decomposition and its performance analysis, Proc. IEEE mt. Conf. Acoust. Speech. Sig. Proc. 1991:3069~3072", or the subspace iteration method with pretreatment by Li Youming and Bao Zheng in "Fast high resolution techniques based on subspace iteration, Chinese Journal of Electronics, 1994. 2" can be adopted in the present method of eigen-decomposition;

(1-4) Calculate decision $\overline{|q_m|}$ according to equation (15), m=1, 2, ..., M;

(1-5) Calculate the ratio $\beta_m = \overline{|q_m|}^2/\overline{|q_{m+1}|}$, m=1, 2, ..., M;

(1-6) Determine the largest $\beta_m$, m=1, 2, ..., M, where the subscript m is the source number.

Method 2: method of source number estimation in real-valued eigenspace (abbreviated as real-valued eigenspace method)

Real-valued eigenspace method includes:

(2-3) Calculate $\hat{R}_{fb}$ from $\hat{R}_X$ according to the method in "The theory and algorithm of estimation of spatial spectrum" written by Wang Yongning;

(2-4) Calculate $\hat{R}_T$ according to equation (17);

(2-5) Conduct eigendecomposition to $\hat{R}_T$ to obtain its eigenvector matrix $U_R=Q_M^H[U_S U_N]=[q_1, q_2, \ldots, q_M]$, where $q_i$ is the eigenvector of $\hat{R}_T$, i=1, 2, ..., M, and $q_i$ is sequenced from large to small according to their corresponding eigenvalues;

(2-6) Calculate $\overline{|q_m|}$ according to equation (15), m=1, 2, ..., M;

(2-7) Calculate ratio $\beta_m = \overline{|q_m|}^2/\overline{|q_{m+1}|}$, m=1, 2, ..., M;

(2-8) Determine the largest $\beta_m$, m=1, 2, ..., M, where the subscript m is the source number.

Section 4. Method of DOA Estimation Using the Method of Source Number Estimation in the Present Invention Suppose a uniform linear array is made up of M elements to receive the signals from signal sources, suppose K far-field narrow-band signals are received (the number of signal sources is K), and suppose that the incidence angles of signals sent out by each signal source corresponding to uniform linear array are $(\theta_1, \theta_2, \ldots, \theta_K)$. The method of DOA estimation using the method of source number estimation in the present invention includes:

(1) The array signal received by linear array is X(t), which is shown in equations (1) and (2), where the source number K is given by the method of source number estimation in the present invention.

(2) Calculate the estimated value of covariance matrix $\hat{R}_X$, which according to equation (5), is an M×M matrix. $\hat{R}_X$ and its eigenvector matrix has already been calculated during the above source number estimation, which is provided for the method of DOA estimation directly.

(3) Acquire DOA according to the methods of DOA estimation introduced by Wang Yongning in "The theory and algorithm of estimation of spatial spectrum".

Although the spirit and concepts of the invention are demonstrated in the embodiments above with reference to the drawings and flow charts, for those skilled in the art, it is readily to be understood that the invention may be implemented in the form of means or devices or products that perform the same functions or achieve the same effects without departure from the scope of the invention.

Next, in order to illustrate the advantages of the present invention, simulation is conducted using the method proposed in the present invention and its result is compared with that using the method in the prior art. Signals X(t) received by array elements adopted in the simulation computation are calculated based on equation (1) and equation (2), and S(t) is narrow-band Gaussian signal.

Example 1

Figure 1:
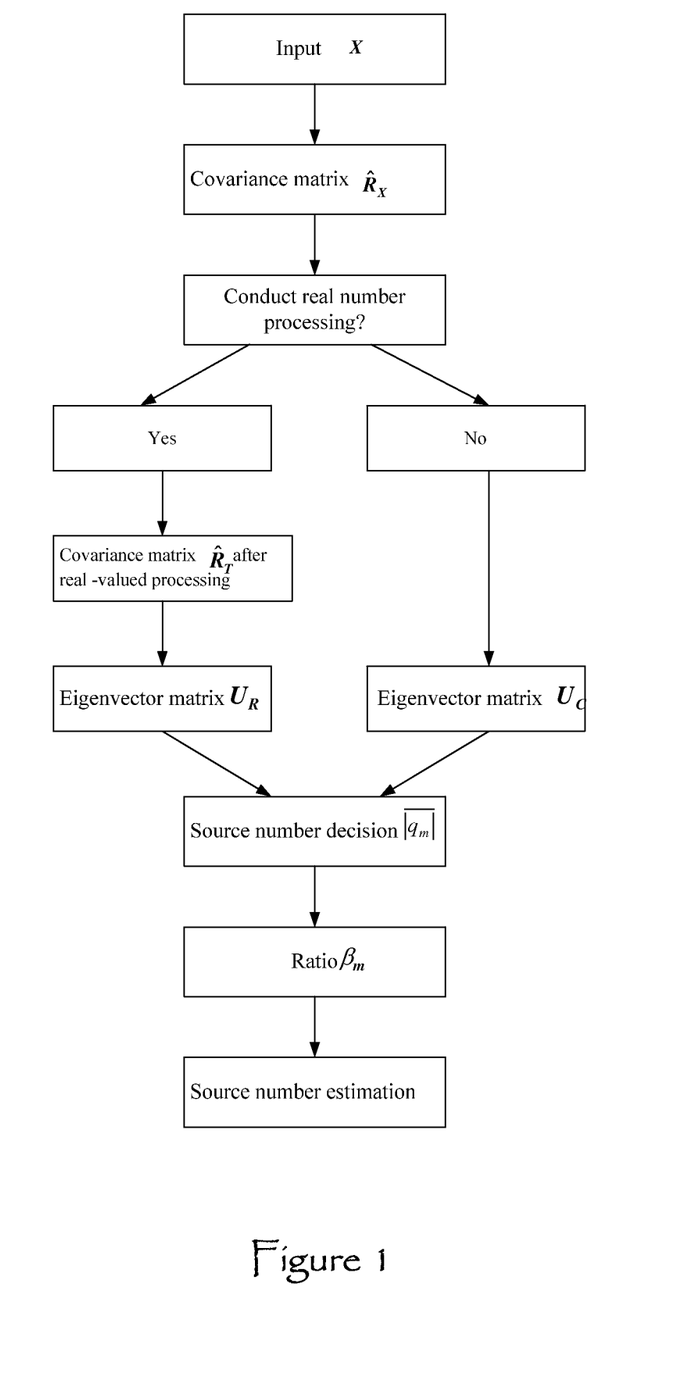
FIG. 1 is a flow chart of a source number estimation method in accordance with the present invention.
Figure 2A:
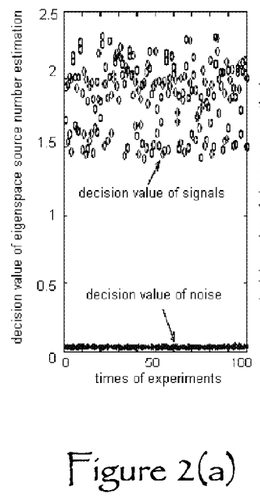
FIG. 2(a) is the result of real-valued eigenspace method in accordance with the present invention.
Figure 2B:
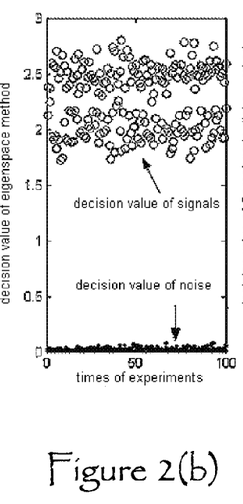
FIG. 2(b) is the result of complex-valued eigenspace method in accordance with the present invention, and is abbreviated as eigenspace method.
Figure 2C:
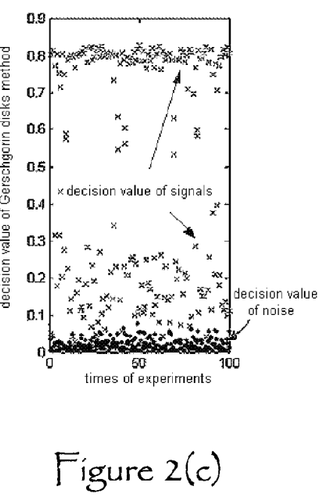
FIG. 2(c) is the result of Gerschgorin disks estimation method in accordance with prior arts.

Simulation computation is conducted in this embodiment, and the primary parameters used in this simulation computation are similar to the example in the article by H. T. Wu, et al. H. T. Wu, et al. use the example in the article to show the advantages of Gerschgorin disks estimation method, and the following computation result will prove that the present invention is obviously superior to the prior art. The parameters in the simulation computation of X (t) are: distance d between neighboring elements of uniform linear array is half wavelength, the number of elements is M=6, target number K=2, incidence angles $(\theta_1, \theta_2)$ are –10° and 10° respectively, signal-to-noise ratio $|S|^2/2\sigma_n^2$ is 5 db, the number of snapshots is 100, incident signal frequency is 150 kHz. The results using the real-valued eigenspace method and the complex-valued eigenspace method in the present invention, as well as the Gerschgorin disks method, are shown in FIG. 2. The decision values of the first two methods are represented by o, the third decision value, namely Gerschgorin disks radii, is represented by x, while the black spot ● represents the decision value of noise. In FIG. 2(a), the abscissa is the number of times the experiment was conducted, and three decision values are produced each time; the ordinate is the decision value for source number estimation using the real-valued eigenspace method in the present invention, namely the magnitude of $\overline{|q_m|}$. In FIG. 2(b), the abscissa is the number of times the experiment was conducted, and three decision values are produced each time; the ordinate is the decision value for source number estimation using the complex-valued eigenspace method in the present invention, namely the magnitude of $\overline{|q_m|}$. In FIG. 2(c), the abscissa is the number of times the experiment was conducted, and three decision values are produced each time; the ordinate is the decision value of the Gerschgorin disks radii. Both in FIG. 2(a) and FIG. 2(b), one group having larger decision value are two values which are estimation decision values of two targets and locate at the top.

The two targets' decision values for estimation in the present invention, which are about 2, are far off from the noise decision value; while in FIG. 2(c), on account of the closeness between decision values of one signal source target in Gerschgorin disks estimation method and decision value of noises, this Gerschgorin disks estimation method is pretty susceptible to underestimation. On the other hand, during the source number estimation in the present invention, given the big difference between the decision value of signal source and decision value of noises, it is convenient to estimate source number for one skilled in the art, thereby improving the precision of source number estimation.

Example 2

Figure 3:
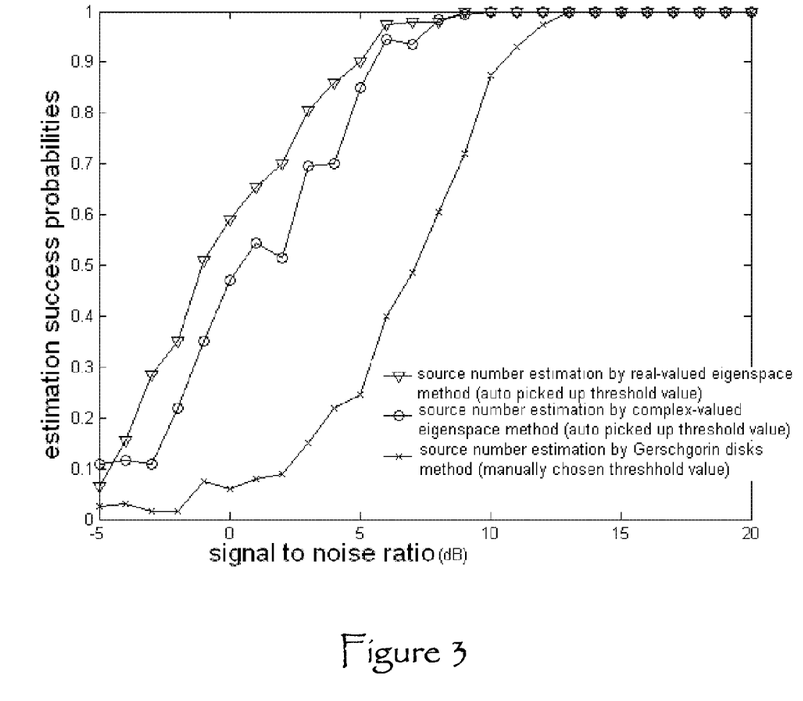
FIG. 3 shows the variance of success probability of source number estimation with signal-to-noise ratio under the condition of the same signal source power, by means of three different methods, namely real-valued eigenspace method, complex-valued eigenspace method as well as Gerschgorin disks method.

It is simulated and calculated that under the condition of the equal power among signal sources, how success probabilities of source number estimation by both the real-valued eigenspace method and the complex-valued eigenspace method in the present invention vary with signal-to-noise ratio. In addition, the comparison with Gerschgorin disks method is also conducted. The parameters in the X (t) simulation computation are as follows: the number of elements of uniform linear array is 8, the distance between neighboring elements is half wavelength. Three independent narrow-band signals having equal power enter a sound array at the incidence angle of 10°, 20°, and 30°, respectively, and the signal frequency is 150 kHz, noises are spatial Gaussian white noises, the number of snapshots is 20, and signal-to-noise ratio changes from −5 db to 20 db. Independent source number estimations are conducted 200 times, respectively, using the real-valued eigenspace method, the complex-valued eigenspace method, and the Gerschgorin disks method. As shown in FIG. 3, their success probabilities are all achieved using a Monte Carlo method. As shown in FIG. 3, within the low signal-to-noise ratio region, the estimation success probabilities by both the real-valued eigenspace method and the complex-valued eigenspace method are obviously superior to the one by the Gerschgorin disks method, and the real-valued eigenspace method produced the best results. Furthermore, the threshold value of estimation decision is chosen manually in the Gerschgorin disks method, while it is picked up automatically in both the real-valued eigenspace method and the complex-valued eigenspace method of the present invention.

Example 3

Figure 4:
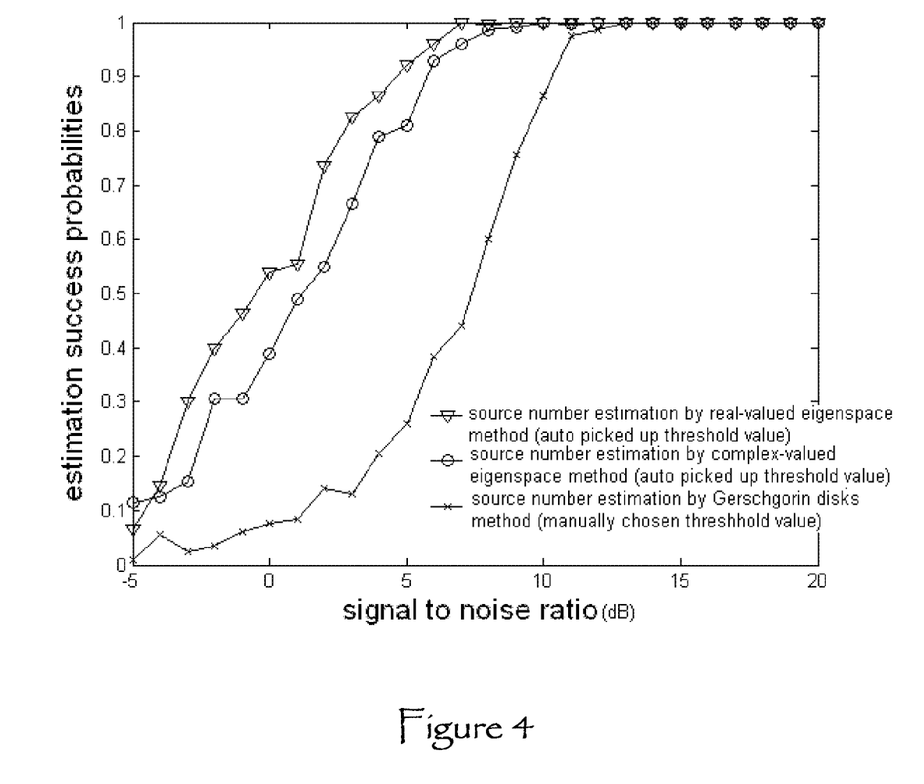
FIG. 4 shows the variance of success probability of source number with signal-to-noise ratio under the condition of the different signal source power, by means of three different methods, namely real-valued eigenspace method, complex-valued eigenspace method as well as Gerschgorin disks method.

It is simulated and calculated that under the condition of the different power among signal sources, how success probabilities of source number estimation by both the real-valued eigenspace method and the complex-valued eigenspace method in the present invention vary with signal-to-noise ratio. In addition, the comparison with the Gerschgorin disks method is also conducted. The parameters in the X (t) simulation computation are as follows: Three independent narrow-band signals with different power enter a sound array at the incidence angle of 40°, 45°, and 60°, respectively, and signals' power ratio is 1:2:1, signal-to-noise ratio takes minimal signal power for reference, and the number of snapshots is 50. Other conditions are the same as in embodiment 2. The results of the calculation are shown in FIG. 4. As shown in FIG. 4, when the signals' source powers are not equal, both the real-valued eigenspace method and the complex-valued eigenspace method are still superior to the Gerschgorin disks method, and the real-valued eigenspace method is the best. Furthermore, the threshold value of estimation decision is chosen manually in the Gerschgorin disks method, while it is picked up automatically in both the real-valued eigenspace method and the complex-valued eigenspace method.

Example 4

Figure 5:
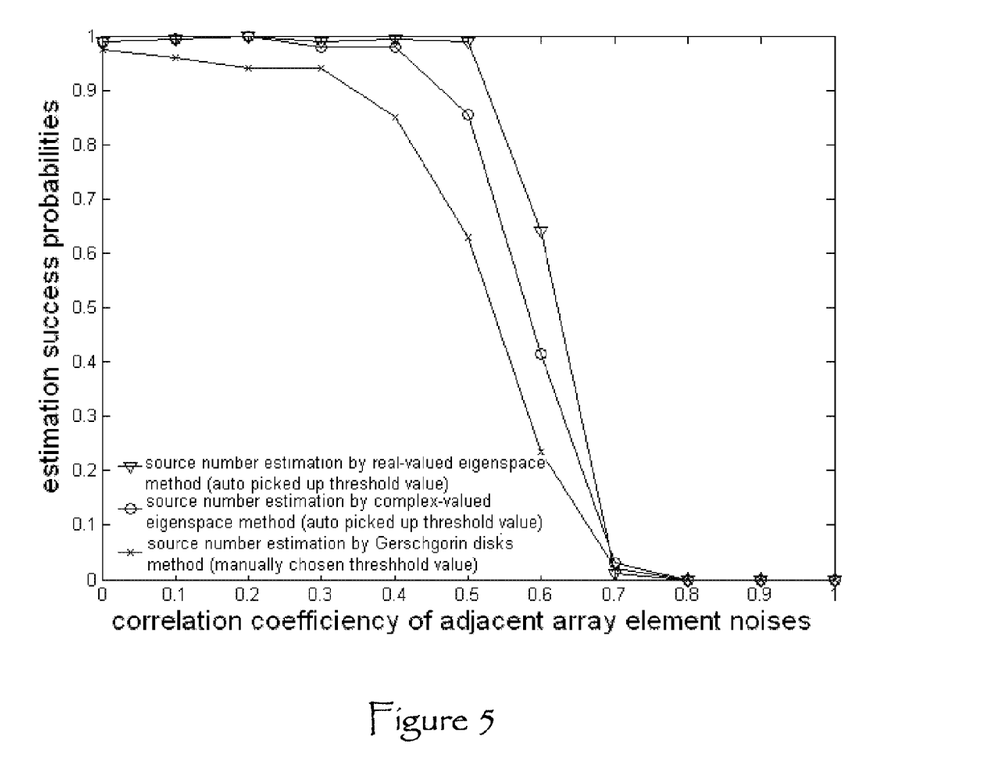
FIG. 5 shows the comparison of success probability of source number estimation under the condition of spatial correlated colored noise, by means of three different methods, namely real-valued eigenspace method, complex-valued eigenspace method as well as Gerschgorin disks method.

It is simulated and calculated that under the condition of spatial correlated colored noises, how the success probabilities of the source number estimation by both the real-valued eigenspace method and the complex-valued eigenspace method in the present invention vary with signal-to-noise ratio. In addition, the comparison with the Gerschgorin disks method is also conducted. The model of spatial correlated colored noises is $$R_{i,k}=E[n_i^*(t)n_k(t)]=\beta^{|i-k|}\exp(j2\pi\phi(i-k)), i,k=1, 2, \ldots, M \quad (20)$$

where $\beta\in[0,1]$ is the spatial correlation coefficient of colored noises on the array element, $\phi$ is 0.1 radian and controls the location of peak value in the noise power spectrum. The parameters in the X(t) simulation computation are as follows: Three independent narrow-band signals having the different power enter a uniform linear array at the incidence angle of 20°, 40°, and 60°, respectively, and the signals' power ratio is 1:2:1. The signal-to-noise ratio is 10 db and takes minimal signal power for reference. Other conditions are the same as in embodiment 2, and the computation results are shown in FIG. 5. As shown in FIG. 5, in the case of a large correlation coefficient, both the real-valued eigenspace method and the complex-valued eigenspace method are obviously superior to the Gerschgorin disks method, and the real-valued eigenspace method has the best performance.

Eigendecomposition is imposed on the M×M order covariance matrix in the present invention, which can be applied into follow-up DOA estimation directly, and another eigendecomposition is saved. If the computation amount of the above eigendecomposition accounts for at least half of the total computation amount during DOA estimation, thereby huge computation amounts can be saved for the signal processing of DOA estimation by virtue of the present invention, and thus hardware cost is also reduced.

The above examples are only used to illustrate the technical solutions of the present invention, not for limitation. While the present invention has been taught with specific reference to these embodiments, one skilled in the art will recognize that the present invention can be realized by method of software, hardware, or a combination of software and hardware, and that changes can be made in form and detail without departing from the spirit and scope of the present invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of source number estimation, comprising:
   (1) obtaining signals X(t) received by a uniform linear array, $X(t)=[x_1(t), x_2(t), L, x_M(t)]^T$ is an M×1 vector, where $x_1, L, x_M$ represent signals received by elements from 1 to M in said uniform linear array, and t represents time;
   (2) calculating the covariance matrix $\hat{R}_X$ according to the received signals by adopting an equation $$\hat{R}_X = \frac{1}{L}\sum_{l=1}^{L} X(t_l)X(t_l)^H,$$

where L is the number of snapshots, calculating matrix $\hat{R}_{fb}$ from the covariance matrix $\hat{R}_X$, where $\hat{R}_{fb}$ is the covariance matrix after a front-back space smooth processing conducted on the received data of the whole array;

calculating the covariance matrix $\hat{R}_T = Q_M^H \hat{R}_{fb} Q_M$ after real-valued computations from $\hat{R}_{fb}$, wherein $Q_M$ is a sparse matrix, when M is 2n or 2n+1 respectively, $Q_M$ is defined as below:

$$\hat{R}_X = \frac{1}{L}\sum_{l=1}^{L} X(t_l)X(t_l)^H,$$

where $J_n$ is an n×n dimension permutation matrix, and $I_n$ is an n×n dimension identity matrix;

(3) conducting eigendecomposition to $\hat{R}_T$ to obtain its eigenvector matrix $U_R = [q_1, q_2, L, q_M]$, where $q_i$ is the eigenvector of $\hat{R}_T$, $q_i = [q_{1i}, q_{2i}, L, q_{mi}L, q_{Mi}]^T$, i=1, 2, L, M; and (4) calculating a source number m according to the $q_i$.

2. The method of claim 1, wherein step (4) further includes:

(4.1) calculating a decision value $\overline{|q_m|}$ by equation $$\overline{|q_m|} = \frac{1}{M}\sum_{i=1}^{M} |q_{im}|, m = 1,2, \ldots, M; \text{ and}$$

m=1, 2, L, M; and (4.2) determining a source number m according to the decision value $\overline{|q_m|}$.

3. The method of claim 2, wherein step (4.2) further includes:

(4.3) calculating a ratio $\beta_m$ based on equation $\beta_m = \overline{|q_m|}^2 / \overline{|q_{m+1}|}$, where m=1, 2, L, M; and (4.4) determining m which corresponds to maximum of $\beta_m$, m=1, 2, L, M, and m is the source number.

4. The method of claim 1, wherein the $q_i$ are sequenced according to their corresponding eigenvalues in step (3), i=1, 2, L, M.

5. A method of DOA estimation, comprising:

(1) receiving array signals by a uniform linear array X(t), and calculating a source number K by the method of source number estimation in claim 1;

(2) obtaining the covariance matrix $\hat{R}_T$, which is an M×M matrix;

(3) conducting DOA estimation using said $\hat{R}_T$, to obtain DOA.

6. A method of DOA estimation, comprising:

(1) receiving array signals by a uniform linear array X(t), and calculating a source number K by the method of source number estimation in claim 2;

(2) obtaining the covariance matrix $\hat{R}_T$, which is an M×M matrix;

(3) conducting DOA estimation using said $\hat{R}_T$, to obtain DOA.

7. The method of DOA estimation according to claim 6, wherein step (4.2) of the source number estimation method further includes:

(4.3) calculating a ratio $\beta_m$ based on equation $\beta_m = \overline{|q_m|}^2 / \overline{|q_{m+1}|}$, where m=1, 2, L, M; and (4.4) determining m which corresponds to maximum of $\beta_m$, m=1, 2, L, M, and m is the source number.

8. A source number estimation device, comprising:

a uniform linear array, including elements from 1 to M for obtaining signals X(t) received by uniform linear array, $X(t) = [x_1(t), x_2(t), L, x_M(t)]^T$ is an M×1 vector, where $x_1$, L, $x_M$ represent the signals received by elements from 1 to M in said uniform linear array, and t represents time;

means of covariance matrix calculation for calculation of covariance matrix $\hat{R}_X$ based on received signals by using equation $$\hat{R}_X = \frac{1}{L}\sum_{l=1}^{L} X(t_l)X(t_l)^H,$$

where L is the number of snapshots;

means for calculating matrix $\hat{R}_{fb}$ based on covariance matrix $\hat{R}_X$, where $\hat{R}_{fb}$ is the covariance matrix after a front-back space smooth processing conducted on received data of the whole array;

means for calculating covariance matrix $\hat{R}_T = Q_M^H \hat{R}_{fb} Q_M$ after the real-valued computations from $\hat{R}_{fb}$, wherein $Q_M$ is a sparse matrix, when M is 2n or 2n+1 respectively, $Q_M$ is defined as below:

$$\hat{R}_X = \frac{1}{L}\sum_{l=1}^{L} X(t_l)X(t_l)^H,$$

where $J_n$ is an n×n dimension permutation matrix, and $I_n$ is an n×n dimension identity matrix; and means of eigendecomposition for eigendecomposition of $\hat{R}_T$ to obtain its eigenvector matrix $U_R = [q_1, q_2, L, q_M]$, where $q_i$ is the eigenvector of $\hat{R}_T$, $q_i = [q_{1i}, q_{2i}, L, q_{mi}, L, q_{Mi}]^T$, i=1, 2, L, M means of source number calculation for calculation of a source number m based on $q_i$.

9. The source number estimation device of claim 8, wherein said means of source number calculation further comprises:

means for calculating decision value $\overline{|q_m|}$ according to equation $$\overline{|q_m|} = \frac{1}{M}\sum_{i=1}^{M} |q_{im}|,$$

m=1, 2, L, M; and means for determination of source number m according to decision value $\overline{|q_m|}$.

10. The source number estimation device of claim 9, wherein said means for determination of source number m according to decision value $\overline{|q_m|}$ further comprises:

means for calculating ratio $\beta_m$ according to equation $\beta_m = \overline{|q_m|}^2 / \overline{|q_{m+1}|}$, where m=1, 2, L, M; and means for determining m that corresponds to maximum of $\beta_m$, m=1, 2, L, M, and m is the source number.

* * * * *